United States Patent

Goebels et al.

[11] Patent Number: 5,733,018
[45] Date of Patent: Mar. 31, 1998

[54] SYSTEM AND METHOD FOR VENTING BRAKE CYLINDERS IN AIR BRAKE SYSTEMS SUBJECT TO SLIP CONTROL

[75] Inventors: Hermann Goebels, Schwieberdingen; Ernst Angermair, Bietigheim-Bissingen, both of Germany

[73] Assignee: Robert Bosch, GmbH, Stuttgart, Germany

[21] Appl. No.: 579,695

[22] Filed: Dec. 28, 1995

[30] Foreign Application Priority Data

Dec. 31, 1994 [DE] Germany ............ 44 47 305.2

[51] Int. Cl.$^6$ .................. B60T 8/36; B60T 13/68
[52] U.S. Cl. .................. 303/118.1; 303/119.2
[58] Field of Search .......... 303/119.1, 119.2, 303/40, 118.1, 59, 60, 68, 84.2, 127, 36, 37, DIG. 1; 137/627.5, 596.17

[56] References Cited

U.S. PATENT DOCUMENTS

| | | | |
|---|---|---|---|
| 3,977,734 | 8/1976 | Ronnhult et al. | 303/119.2 |
| 5,100,208 | 3/1992 | Angemair | 303/36 |
| 5,118,169 | 6/1992 | Moller | 303/118.1 |

FOREIGN PATENT DOCUMENTS

| | | |
|---|---|---|
| 0547407 A1 | 11/1992 | European Pat. Off. |
| 4008095 | 9/1991 | Germany. |
| 1497150 | 1/1978 | United Kingdom. |
| WOA9109760 | 7/1991 | WIPO. |

*Primary Examiner*—Josie Ballato
*Attorney, Agent, or Firm*—Edwin E. Greigg; Ronald E. Greigg

[57] ABSTRACT

This invention achieves a complete dissipation of a residual pressure in a brake cylinder. The air brake system has a pressure control valve arranged between a brake valve and the brake cylinder. This pressure control valve has an outlet valve which controls the connection between an outlet chamber to which the brake cylinder is connected, and a venting space and has a control chamber. A connection between the control chamber and the venting space can be controlled by way of a control valve. There is furthermore a connecting conduit between the outlet chamber and the control chamber of the outlet valve. In the case of a braking operation, the control valve is switched briefly into its open position after the actuation of the brake valve ceases, allowing the residual pressure in the brake cylinder to be dissipated to the venting space via the connecting conduit. The method can be employed in commercial-vehicle air brake systems.

4 Claims, 1 Drawing Sheet

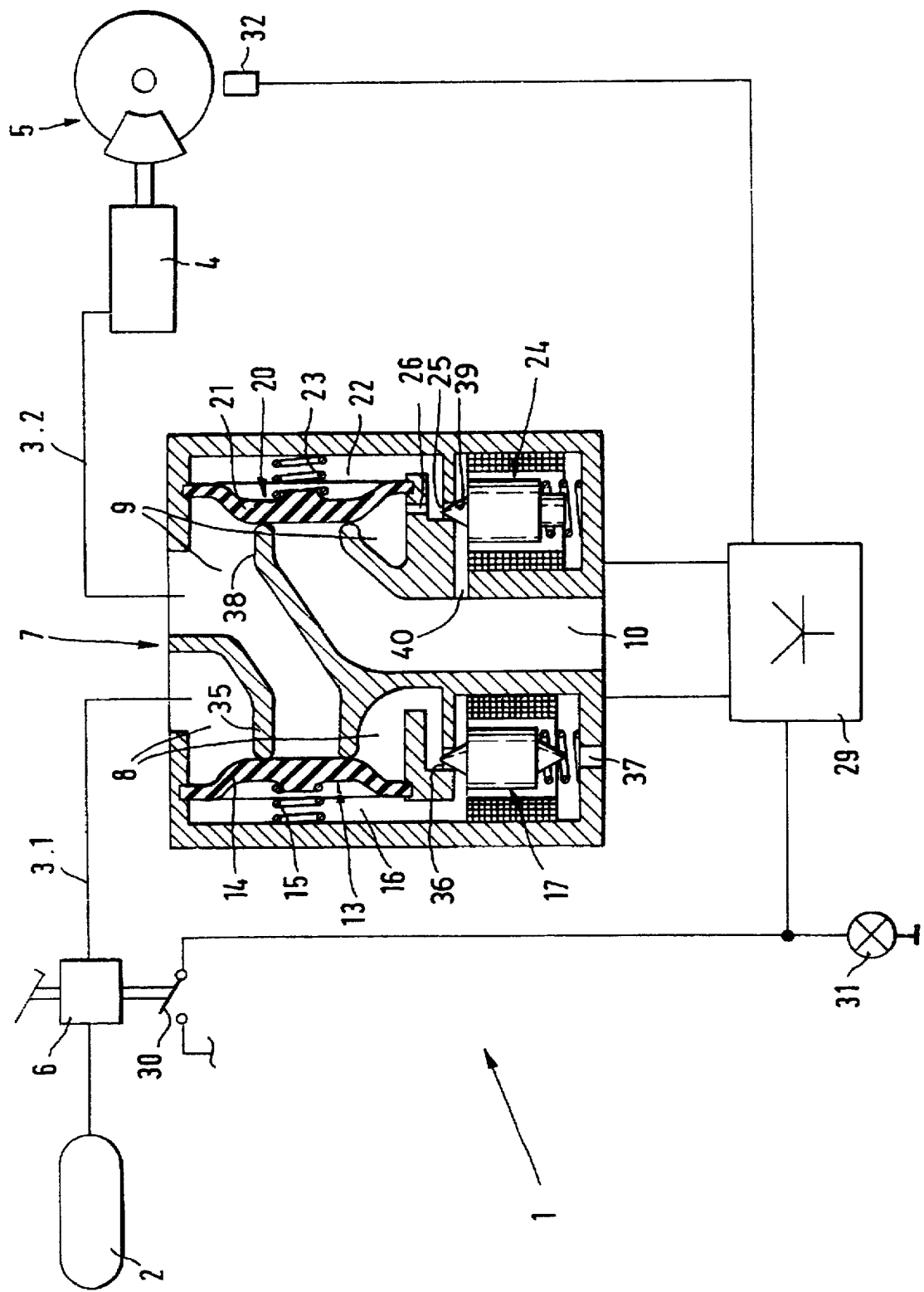

SYSTEM AND METHOD FOR VENTING BRAKE CYLINDERS IN AIR BRAKE SYSTEMS SUBJECT TO SLIP CONTROL

PRIOR ART

The invention is directed to a system and method for venting brake cylinders in air brake systems subject to slip control;

A method of this kind for venting brake cylinders in air brake systems is already known (DE 25 17 571 A1). In this method, when the brake is released during a braking operation without slip control the compressed air fed into the brake cylinder forces a switching diaphragm—spring-loaded in the closing direction—of the inlet valve back in the pressure control valve and flows off to the atmosphere via a vent of the brake valve. During this process, the pressure transmitted from the outlet chamber to the control chamber of the outlet valve via the connecting conduit holds the outlet valve closed. The compressed air flowing back from the brake cylinder can then only take the flow path via the inlet valve for as long as the spring loading of the switching diaphragm of the inlet valve is overcome. However, the falling pressure has the result that, at a residual pressure of about 0.1 bar, the inlet valve also closes and further return flow of the compressed air from the brake cylinder to the brake valve is prevented. However, air brake systems fitted with disk brakes, in particular, react in a disadvantageous manner to such a residual pressure in the brake cylinder, by thermal overloading of the brake and increased wear of the brake linings.

Admittedly, a method is also known (DE 40 08 095 A1) in which, during the release of the brake brought about a foot-operated brake valve, the outlet valve of a pressure control valve substantially of the generic type is switched into the open position in order to lead off the compressed air to be released to the atmosphere over a short route via the venting space of the pressure control valve. However, since, here too, the compression spring of the outlet valve moves the switching diaphragm of the latter into the closed position before complete pressure dissipation, complete pressure dissipation in the brake cylinder is not achieved.

ADVANTAGES OF THE INVENTION

In contrast, the method according to the invention has the advantage that the residual pressure in the brake cylinder is completely dissipated along a path leading from the outlet chamber via the connecting conduit and the aperture cross section of the control valve belonging to the outlet valve to the venting space of the pressure control valve and on to the atmosphere.

According to a further development of the method, a signal which disappears at the end of brake-valve actuation is advantageously used to trigger the switching over of the control valve.

BRIEF DESCRIPTION OF THE DRAWING

An example according to the method is explained in greater detail in the following description with reference to a drawing which illustrates an air brake system schematically in simplified form.

DETAILED DESCRIPTION OF THE EXAMPLE OF THE METHOD

A commercial-vehicle air brake system 1 illustrated in the drawing and subject to braking-slip control has a compressed-air reservoir 2 from which a line 3.1, 3.2 is passed to a brake cylinder 4 of a wheel brake 5 designed as a disk brake. Arranged in the course of line section 3.1 is a brake valve 6 which can be operated by the foot of the driver of the vehicle. Situated between the brake valve 6 and the brake cylinder 4, in the course of the line 3.1, 3.2, is a pressure control valve 7 for braking-slip control of the wheel brake 5. The pressure control valve 7 has an inlet chamber 8 into which the line section 3.1 coming from the brake valve 6 opens. The pressure control valve 7 furthermore has an outlet chamber 9, to which the line section 3.2 leading to the brake cylinder 4 is connected. The pressure control valve 7 is furthermore provided with a venting space 10 leading to the atmosphere.

The fluid flow connection of the inlet chamber 8 to the outlet chamber 9 of the pressure control valve 7 is controlled by an inlet control valve 13. The inlet control valve 13 has a switching diaphragm 14 which is spring loaded in the closing direction of the inlet control valve by a compression spring 15 in a control chamber 16. The switching diaphragm seats on a cylindrical part 35 on the inner area of the pressure control valve 7 so that the inlet chamber 8 surrounds the cylindrical part 35, as shown by the two lead lines leading from reference character 8. Thus, the air pressure in the inlet chamber 8 is applied equally on the area of the switching diaphragm 14 which surrounds the cylindrical part. It is to be noted that the inlet chamber extends to the control valve 17. The control chamber 16 can be connected to the inlet chamber 8 or to atmosphere by means of a control valve 17 designed as a 3/2-way valve. The control valve is provided with two valve openings 36 and 37 which are controlled by the electromagnet. In the spring-actuated position of the control valve 17, the latter shuts off the connection of the control chamber 16 via valve opening 36 to the inlet chamber 8 and frees the connection of the control chamber to atmosphere via valve opening 37. When actuated by an electromagnet, the control valve 17 shuts off the connection to atmosphere via valve opening 37, while the connection between the inlet chamber 8 and the control chamber 16 is opened. It can therefore be seen that the electromagnet controls air flow from the control chamber 16 via opening 37 to the atmosphere or controls the air flow from inlet chamber 8 to the control chamber 16 via opening 36. When the electromagnet 17 is activated the opening 37 is closed so that air flows form inlet chamber 8 to the control chamber 16.

The pressure control valve 7 is furthermore provided with an outlet control valve 20 which controls the connection between the outlet chamber 9 and the venting space 10. This valve likewise has a switching diaphragm 21, which is loaded in the closing direction of the outlet valve by a compression spring 23 arranged in a control chamber 22. The switching diaphragm 21 seats on a second cylindrical part 38 within the pressure control valve 7 so that the outlet chamber 9 surrounds the cylindrical part 37 as shown by the two lead lines that lead from the reference character 9. Thus, the air pressure in the outlet chamber 9 is applied equally on the surface of the switching diaphragm that surrounds the cylindrical part 37. It is to be noted that the outlet chamber extends to the control valve 24 via the connecting conduit 26 in the housing. The outlet control valve 20 is assigned an electromagnetic control valve 24 designed as a 2/2-way valve. The electromagnetic control valve 24 is provided with one valve seat opening 39 which controls air flow from the control chamber 22 via an aperture cross section 25 and a passage 40 to the venting space 10. When actuated by an electromagnet, the control valve 24 opens an aperture cross section 25 by which the control chamber 22 is connected to the venting space 10 leading to the atmosphere. A connecting conduit 26 from the outlet chamber 9 to the control chamber 22 is furthermore provided. The aperture cross section 25 of the control valve 24 is larger than the cross section of the connecting conduit 26.

The control valves 17 and 24 can be operated by a control unit 29 of the air brake system 1. Connected to the control unit 29 is a brake light switch 30 which is closed when the brake valve 6 is actuated and likewise activates a brake light 31 of the commercial vehicle. Also electrically connected to the control unit 29 is a sensor 32 for monitoring the rotational behavior of the vehicle wheel (not shown) assigned to the wheel brake 5. It also goes without saying that the control unit 29 monitors other wheel brakes, each of which is connected to the brake drum via a pressure control valve operated by the control unit.

In the case of a braking operation, compressed air is fed into the inlet chamber 8 of the pressure control valve 7 from the reservoir 2 via line section 3.1 by actuating the brake valve 6. The compressed air in the inlet chamber 8 opens the inlet valve 13 by displacing the switching diaphragm 14 counter to the force of the compression spring 15, allowing the compressed air into the outlet chamber 9. At the same time, compressed air flows through the connecting conduit 26 into the control chamber 22 of the outlet valve 20 and holds the latter closed. From the outlet chamber 9, the compressed air passes through line section 3.2 into the brake cylinder 4 and builds up brake pressure there to apply the wheel brake 5. The actuation of the brake valve 6 closes the brake light switch 30 and the brake light 31 is lit up.

During the braking operation, the sensor 32 monitors the braked vehicle wheel for an impermissibly high braking slip. In the case of a braking operation where there is no danger that the vehicle wheel will lock up, the control valves 17 and 24 in the pressure control valve 7 are not operated by the control unit 29. If, during such a braking operation without slip control, the brake pressure in the brake cylinder 4 is reduced or the braking operation ended, compressed air flows from the brake cylinder 4 via line section 3.2 into the outlet chamber 9, opens the inlet valve 13 and passes into the inlet chamber 8, from which the compressed air flows via line section 3.1 to the brake valve 6 and is released to atmosphere via the vent 6.1 of the brake valve. During this process, the outlet valve 20 remains closed despite the pressure balance in the control chamber 22 of the outlet valve 20 brought about by the connecting conduit 26, since the effective area of the switching diaphragm 21 in the control chamber 22 is larger than that in the outlet chamber 9. Upon brake release, the pressure in the brake cylinder 4 falls to a residual pressure of about 0.1 bar, which is no longer sufficient in the outlet chamber 9 to keep the inlet valve 13 open counter to the force of the compression spring 15. Accordingly, the inlet valve 13 assumes its closed position, in which the outlet valve 20 remains also.

When the actuation of the brake valve 6 ceases, the brake light switch 30 is opened, with the result that the brake light signal decays. In the case of the braking operation described above without slip control of the braked vehicle wheel, the control unit 29 now, according to the invention, switches the control valve 24 of the outlet valve 20 briefly into the open position. The length of time for which the control valve 24 is switched over is about 1 second and, during this time period, the residual pressure in the brake cylinder 4 can thus be dissipated completely along a path running via the connecting conduit 26 and the aperture cross section 25 of the control valve 24 into the venting space 10 leading to the atmosphere. After the expiry of said time period, the control valve 24 is switched by the control unit 29 into the position into which it closes the aperture cross section 25. If the brake valve 6 is actuated again during the residual-pressure dissipation described, the control unit 29 switches the control valve 24 into the closed position simultaneously with the switching on of the brake light 31.

If an impermissibly high brake slip occurs during a braking operation at the vehicle wheel assigned to the wheel brake 5, this is detected by the sensor 32 and a braking-slip control operation is initiated by the control unit 29. For the dissipation of brake pressure in the brake cylinder 4, the control valve 17 is switched over, with the result that the feeding of compressed air into the control chamber 16 shuts off the inlet valve 13. In addition, the control valve 24 of the outlet valve 20 is switched over, allowing compressed air to flow off from the control chamber 22 to atmosphere via the aperture cross section 25 and the venting space 10. During this process, compressed air also flows from the outlet chamber 9 through the connecting conduit 26. However, since the aperture cross section 25 of the control valve 24 is larger than the cross section of the connecting conduit 26, a pressure reduction is achieved in the control chamber 22, with the result that the outlet valve 20 is opened by the pressure in the outlet chamber 9 and compressed air can flow off to atmosphere via the venting space 10.

In pressure-maintaining phases, the inlet valve 13 remains in the closed position described above, while the control valve 24 is switched back by the control unit 29 into the position shown, in which the aperture cross section 25 is shut off and compressed air flowing from the outlet chamber 9 into the control chamber 22 via the connecting conduit 26 can move the outlet valve 20 into its closed position.

In phases for pressure build-up, the control valve 24 of the outlet valve 20 remains in the position shown, while the control unit 29 switches the control valve 17 into the position shown in order to depressurize the control chamber 16.

In the case of a braking operation on slick ice, the connecting conduit 26 makes it possible to reduce the brake pressure in the brake cylinder 4 to pressure values below the residual pressure by opening the aperture cross section 25. If, on completion of the slip control operation, the braking operation is ended by cancellation of the actuation of the brake valve 6, then, in accordance with the invention, the control valve 24 is switched over briefly into the open position as soon as the brake light signal disappears, allowing the brake pressure in the brake cylinder 4 to dissipate completely.

The foregoing relates to preferred exemplary embodiments of the invention, it being understood that other variants and embodiments thereof are possible within the spirit and scope of the invention, the latter being defined by the appended claims.

We claim:

1. A method for venting brake cylinders (4) in an air brake system (1) subject to slip control, including at least one pressure control valve (7), which is arranged between a driver-actuated brake valve (6) and at least one brake cylinder (4) and which has an inlet chamber (8) connected to the brake valve (6), an outlet chamber (9) connected to the brake cylinder (4), a venting space (10) that leads to the atmosphere, an inlet valve (13) which controls a connection between the inlet chamber (8) and the outlet chamber (9) and has a switching diaphragm (14) spring-loaded in a closing direction, and an outlet valve (20) which controls a connection (25) between the outlet chamber (9) and the venting space (10), a switching diaphragm (21) which is loaded in a closing direction of the outlet valve (20) by a compression spring (23) in a control chamber (22), the method comprising opening a connection between the control chamber (22) and the venting space (10) in phases for pressure reduction by operating a control valve (24) which is switched electromagnetically into an open position during a slip control operation, a aperture cross section of the control valve (24) being larger than a cross section of a connecting conduit (26) between the outlet chamber (9) and the control chamber (22), and in the case of a braking operation without slip control, briefly switching the control valve (24) of the outlet valve (20) into an open position after the actuation of the brake valve (6) ceases.

2. The method as claimed in claim 1, wherein the switching of the control valve (24) into the open position is triggered by a decaying brake light signal.

3. A system for venting brake cylinders in a compressed air brake system (1) subject to slip control, comprising at least one pressure control valve (7), which is arranged between a driver-actuated brake valve (6) and at least one brake cylinder (4), said at least one pressure control valve (7) includes an inlet chamber (8) connected to the brake valve (6), an outlet chamber (9) is connected to the brake cylinder (4), a venting space (10) that leads to the atmosphere, an inlet valve (13) which controls a connection between the inlet chamber (8) and the outlet chamber (9), said inlet valve (13) has a switching diaphragm (14) spring loaded in a closing direction, and an outlet valve (20) which controls a connection between the outlet chamber (9) and the venting space (10), a switching diaphragm (21) which is loaded in a closing direction of the outlet valve (20) by a compression spring (23) in a control chamber (22), a connection which connects the control chamber (22) to the venting space (10) is opened in phases for pressure reduction by a control valve (24) which is switched electromagnetically into an open position during a slip control operation, an aperture cross section of the control valve (24) is larger than a cross section of a connecting conduit (26) between the outlet chamber (9) and the control chamber (22), wherein, in a case of a braking operation without slip control, the control valve (24) of the outlet valve (20) is switched briefly into the open position after an actuation of the brake valve (6) ceases.

4. The system as claimed in claim 3, wherein the switching of the control valve (24) into the open position is triggered by a decaying brake light signal.

\* \* \* \* \*